US007471286B2

(12) United States Patent
Chung

(10) Patent No.: US 7,471,286 B2
(45) Date of Patent: Dec. 30, 2008

(54) CIRCUITS AND METHODS FOR DRIVING FLAT PANEL DISPLAYS

(75) Inventor: Kyu Young Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 539 days.

(21) Appl. No.: 10/704,075

(22) Filed: Nov. 7, 2003

(65) Prior Publication Data

US 2005/0057481 A1 Mar. 17, 2005

(30) Foreign Application Priority Data

Sep. 16, 2003 (KR) ..................... 10-2003-0063939

(51) Int. Cl.
*G06F 3/038* (2006.01)
*G09G 5/00* (2006.01)

(52) U.S. Cl. ........................................ 345/211; 345/98

(58) Field of Classification Search .................. 345/94, 345/98, 100, 211–212
See application file for complete search history.

(56) References Cited

U.S. PATENT DOCUMENTS 5,291,437 A * 3/1994 Rountree .................... 365/149
6,970,161 B2 * 11/2005 Kashiwada ................. 345/204
2002/0118158 A1 * 8/2002 Yamamoto et al. ............ 345/89

* cited by examiner

*Primary Examiner*—Amr Awad
*Assistant Examiner*—Michael Pervan

(57) ABSTRACT

Circuits and methods for driving gates lines of a flat panel display, wherein gate driver circuit architectures provide compact designs that enable smaller chip sizes for gate driver ICs. In one aspect, a semiconductor integrated gate driver IC comprises a plurality of gate driver circuits, wherein each gate driver circuit drives a corresponding gate line of a display, and a level shifter circuit, for generating a precharge control signal for the gate driver circuits. Each gate driver circuit comprises a line decoder for decoding a gate line control signal and generating a decoded gate line control signal and a precharge circuit for precharging a gate driver turn-on voltage in response to the precharge control signal before activating the gate line. During a driving phase, the precharged gate driver turn-on voltage is discharged when the gate line is activated in response to the decoded gate line control signal, whereas the precharged gate driver turn-on voltage is maintained when the gate line is not activated in response to the decoded gate line control signal.

42 Claims, 9 Drawing Sheets

300

400

$T_1$ = PRECHARGING PHASE
$T_2$ = DRIVING PHASE

CIRCUITS AND METHODS FOR DRIVING FLAT PANEL DISPLAYS

CROSS-REFERENCE TO RELATED APPLICATION

This application claims priority to Korean Patent Application No. 2003-63939, filed Sep. 16, 2003, in the Korean Intellectual Property Office.

TECHNICAL FIELD OF THE INVENTION

The present invention relates generally to circuits and methods for driving flat panel displays (e.g., a liquid crystal display (LCD)) and, in particular, to gate driver circuits and methods for driving gates lines of flat panels displays, wherein gate driver circuit architectures provide compact designs that enable smaller chip sizes for gate driver ICs.

BACKGROUND

Various types of flat panel displays such as liquid crystal displays (LCDs), plasma display panels (PDPs), electroluminescence display panels, LED display panels, etc., have been developed to replace traditional cathode ray tube (CRT) displays. Such flat panel displays are suitable for devices and applications requiring small dimension, light weight and low power consumption. For example, LCDs can be operated using a large scale integration (LSI) driver since LCDs can be driven by a low-voltage power supply and have low power consumption. Accordingly, LCDs have been widely implemented for laptop computers, pocket computers, automobiles, and color televisions, etc. The light weight, smaller dimension, and lower power consumption features of LCD devices render such display devices suitable for use with, e.g., portable, handheld devices.

In general, the signals that are used for driving flat panel displays are voltage or current signals that are either proportional or inversely proportional to the desired brightness of pixels of the display. The driving signals are generated from driving devices/apparatus (which include semiconductor integrated circuits (ICs)) disposed adjacent to the display panel. Depending on the display type, the driving signals will operate to change the panel electrically or optically.

FIG. 1 is a schematic diagram that illustrates a conventional display system. The display system (100) comprises a display panel (110) (e.g., LCD) and a plurality of components for driving/controlling the display panel (110) including, e.g., a controller (120), a gate driver IC (130) and a source driver IC (140). The display panel (110) comprises a plurality of data lines (DL1~DLn) that are connected to the source driver IC (140) and a plurality of gate lines (GL1~GLn) that are connected to the gate driver IC (130). The display panel (110) comprises a plurality of pixels arrayed in a matrix of rows and columns, wherein the pixels in a given row are commonly connected to a gate line (GLi) and wherein the pixels in a given column are commonly connected to a data line (DLi). The display panel (110) displays an image in response to source signals output to the data lines (DL1~DLn) from the source driver IC (140) and gate driver control signals output to the gate lines (GL1~GLn) from the gate driver IC (130).

More specifically, the controller (120) receives as input a plurality of driving data signals and driving control signals that are output from an image supply source (e.g., a main board of a computer). The driving data signals comprise R, G, B data for forming an image on the display (110). The driving control signals comprise vertical synchronous signals (Vsynch), horizontal synchronous signals (Hsync), a data enable signal (DE) and a clock signal (Clk). The controller (120) outputs to the source driver IC (140) a plurality of data signals R', G' and B' (driving data), which correspond to the input R, G, B data, and a source control signal (SC) (driving control signal). The controller (120) outputs a gate control signal (SG) to control the gate driver IC (130).

The gate driver IC (130) receives as input a plurality of DC voltages including VDD (logic power supply voltage), $V_{SS}$ (logic ground voltage), $V_{GH}$ (gate driver turn-on voltage), $V_{GOFF}$ (gate driver turn-off voltage) and $V_{COM}$ (common electrode voltage). The gate driver IC (130) outputs gate driver controls signals (having logic levels of $V_{GH}$ or $V_{GOFF}$) to the gate lines (GL1~GLn) to drive selected gate lines. The source driver IC (140) determines source signals to be output to the data lines (DL1~DLn) in response to the data signals (R', G', B') and the source control signal (SC).

The controller (120) controls the timing for which data and control signals are output from the source driver IC (140) and gate driver IC (130). For example, in one mode of operation, the controller (120) generates the control signals SC and SG such that the gate driver IC (130) transmits a gate driver output signal $V_{GH}$ to each gate line (GL1~GLn) in a consecutive manner and data voltage is selectively applied to each pixel in an activated row one by one in order. In another mode of operation, the pixels can be charged by sequentially scanning pixels in a first column and thereafter scanning pixels in a next column.

Assuming the display panel (110) is a TFT-LCD, the display panel (110) would include a thin-film transistor (TFT) board comprising a plurality of pixel units arranged in matrix form. As shown in FIG. 1, each pixel unit comprises a TFT (150), a liquid crystal capacitor (151), which is connected between a drain electrode of the TFT (150) and a common electrode ($V_{COM}$), and a thin-film storage capacitor (152), which is connected in parallel with the liquid crystal capacitor (151). The storage capacitor (152) stores an electric charge so that an image on the display is maintained during a non-selected period. The liquid crystal capacitor (151) is formed by a common electrode ($V_{COM}$) of a color filter plate, a pixel electrode of the TFT (150) and liquid crystal material therebetween. A source electrode of the TFT (150) is connected to a data line (DL1) and a gate electrode of the TFT (150) is connected to a gate line (GL1). The TFT (150) acts as a switch that applies a source voltage on the data line (DL1) to the pixel electrode when a gate driver signal of $V_{GH}$ on the gate line (GL1) is applied to the gate of the TFT (150).

FIG. 2 is a block diagram that schematically illustrates a gate driver IC having a conventional architecture, which can be implemented in the system of FIG. 1 for driving a flat panel display such as a TFT-LCD. In general, as depicted in FIG. 2, a conventional gate driver (200) comprises a row driver selecting unit (210), a line decoder (220), voltage level shifter circuits (230) and buffers (drivers) (240). The row driver selecting unit (210) generates a gate line control signal, G[m:0] in response to a driver control signal (STV) that specifies one of a plurality of gate lines (GL1~GLn) to be selected. The line decoder (220) comprises a plurality of line decoders (220-1~220-n), each associated with one of the gate lines (GL1~GLn). Each line decoder (220-1~220-n) decodes the gate line control signal G[m:0] and generates a corresponding decoded gate line control signal (GD[1]~GD[n]).

The voltage level shifter circuits (230) comprise a plurality of separate level shifter circuits (230-1~230-n), each associated with one of the gate lines (GL1~GLn). Each level shifter circuit (230-1~230-n) receives a corresponding decoded gate line control signal (GD[1]~GD[n]) output from a corresponding line decoder (220-1~220-n). DC voltages, $V_{GH}$ and $V_{GOFF}$ are applied to each level shifter circuit (230-1~230-n), wherein $V_{GH}$ is a predetermined gate driver turn-on voltage (e.g., +15 v) and $V_{GOFF}$ is a predetermined gate driver turn-off voltage (e.g., −8 v). Each level shifter (230-1~230-n) changes the voltage level of a corresponding decoded gate line control signal (GD[1]~GD[n]) from $V_{DD}$ to $V_{GH}$ or from $V_{SS}$ to $V_{GOFF}$. The buffers (240) comprise a plurality of buffers (drivers) (240-1~240-n)) that are connected to the output of corresponding level shifters (230-1~230-n), for driving corresponding gate lines (GL1~GLn) via corresponding gate driver output signals (G1~Gn). Details regarding operation of a level shifter circuit and buffer are described below with reference to FIG. 3.

FIG. 3 is a circuit diagram illustrating a conventional level shifter circuit and output buffer, which can be implemented in the gate driver circuit of FIG. 2. For purposes of illustration, FIG. 3 depicts circuit architectures of a voltage level shifter (230-i) and corresponding buffer (driver) (240-i), which can be implemented for each of the level shifters (230-1~230-n) and buffers (240-1~240-n) shown in FIG. 2. The level shifter (230-i) comprises a plurality of NMOS transistors (NT1~NT6) and a plurality of PMOS transistors (PT1-PT6) operatively connected as shown. The level shifter (230-i) receives as input the decoded gate line control signal GD[i] output from a corresponding line decoder (220-i). In the illustrative embodiment, the decoded gate line control signal GD[i] comprises GD[i] (which is $V_{DD}$ or $V_{SS}$) and its complement GDB[i]. The level shifter (230-i) also receives as input DC voltages $V_{GH}$ and $V_{GOFF}$. The buffer (240-i) comprises two inverters, a first inverter comprising PMOS transistor (PT7) and NMOS transistor (NT7), and a second inverter comprising PMOS transistor (PT8) and NMOS transistor (NT8).

FIG. 4 is a waveform diagram illustrating operation of the circuit of FIG. 3. More specifically, FIG. 4 illustrates the gate driver voltage (Gi) that is output to gate line (GLi) based on the logic level of the decoded gate line control signal (GD[i]/GDB[i]). As shown in FIG. 4, when the logic level of GD[i] $=V_{DD}$ and the logic level of GDB[i]$=V_{SS}$, the gate line voltage GLi$=V_{GH}$ (e.g., +15 v) to activate (turn-on) the gate line. When the logic level of GD[i]$=V_{SS}$ and the logic level of GDB[i]$=V_{DD}$, the gate line voltage GLi$=V_{GOFF}$ (e.g., −8 v) to deactivate (turn-off) the gate line.

Although the operation of the level shifter and buffer circuit of FIG. 3 is known and readily understood by those of ordinary skill in the art, a brief description will be provided. Assume GD[i]$=V_{DD}$ and GDB[i]$=V_{SS}$. A logic "1" is applied to the gate of NT1 and a logic "0" is applied to the gate of NT2. As such, NT1 is turned on and NT2 is turned off, causing node N1 to be pulled down to logic "0" and node N2 is floating. With node N1 at logic "0", PMOS transistors PT2, PT3 and PT5 will be turned on, which causes $V_{GH}$ to be applied to the gates of transistors NT3 and NT6 to turn on such transistors.

When designing display panel systems (such as shown in FIG. 1), it is highly desirable to provide architectures that reduce the size of such systems, especially when such systems are implemented for small, handheld portable devices (e.g., PDAs, etc.). One way in which the size of such display systems can be reduced is by reducing the size of the IC chips that are used to drive the display panel. The architecture of the conventional gate driver circuit as described above (FIGS. 2 and 3) is disadvantageous in this regard because the level-shifter circuits (230) occupy a significant amount of space, which results in an increase of the chip size of the gate driver IC. Indeed, as shown in FIG. 2, the conventional gate driver circuit comprises n voltage level shifters (230-1~230-n), and as shown in FIG. 3, each voltage level shifter (230-1~230-n) comprises 12 high-voltage transistors—six (6) PMOS and six (6) NMOS transistors, each of which are constructed to be significantly large due to the wide voltage range (e.g., $V_{GH}$=+15 v and $V_{GOFF}$=−8 v). As the range of level shifting becomes wider, the size of such transistors must be increased for proper operation. In the conventional architecture described above, the level shifter circuits (230-1~230-n) occupy approximately 50% of the total chip size of the gate driver IC.

SUMMARY OF THE INVENTION

Exemplary embodiments of the present invention include circuits and methods for driving flat panel displays (e.g., a liquid crystal display (LCD)) and, in particular, to gate driver circuits and methods for driving gates lines of a display panel. Exemplary gate driver circuit architectures according to the present invention provide compact designs that enable smaller chip sizes for gate driver ICs.

In one exemplary embodiment of the present invention, a semiconductor integrated gate driver circuit for driving gate lines of a display is provided. The gate driver IC comprises a plurality of gate driver circuits, wherein each gate driver circuit drives a corresponding gate line of the display, and a level shifter circuit, for generating a precharge control signal for the gate driver circuits. Each gate driver circuit comprises a line decoder for decoding a gate line control signal and generating a decoded gate line control signal and a precharge circuit for precharging a gate driver turn-on voltage in response to the precharge control signal before activating the gate line. During a driving phase, the precharged gate driver turn-on voltage is discharged when the gate line is activated in response to the decoded gate line control signal, whereas the precharged gate driver turn-on voltage is maintained when the gate line is not activated in response to the decoded gate line control signal.

In another exemplary embodiment of the invention, each precharge circuit comprises four transistors and two capacitors, wherein a first capacitor stores the precharged gate driver turn-on voltage and wherein a second capacitor stores a precharged gate driver turn-off voltage.

In another exemplary embodiment of the invention, each precharge circuit comprises four transistors and two latch circuits, wherein a first latch circuit stores the precharged gate driver turn-on voltage and wherein a second latch circuit stores a precharged gate driver turn-off voltage.

Advantageously, gate driver circuits according to exemplary embodiments of the invention utilize precharging circuits in lieu of the level shifter circuits used in the conventional gate driver circuit, such as described above with reference to FIGS. 2 and 3, which enable more compact gate driver designs resulting in smaller IC driver chips.

These and other exemplary embodiments, aspects, features and advantages of the present invention will be described and become apparent from the following detailed description of exemplary embodiments, which is to be read in connection with the accompanying drawings.

DETAILED DESCRIPTION OF EXEMPLARY EMBODIMENTS

Figure 1:
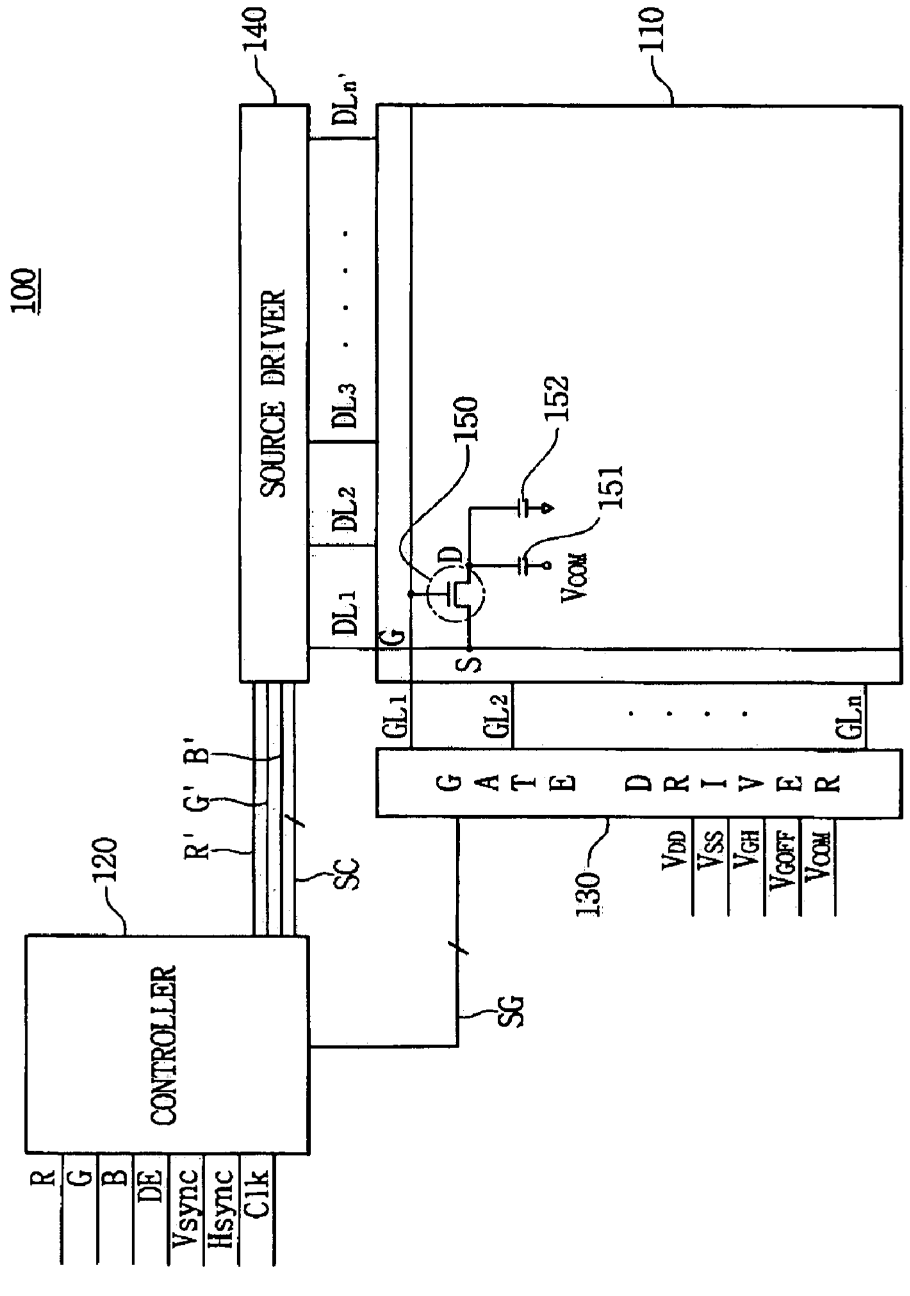
FIG. 1 (PRIOR ART)
FIG. 1 is a schematic diagram that illustrates a conventional display system.
Figure 5:
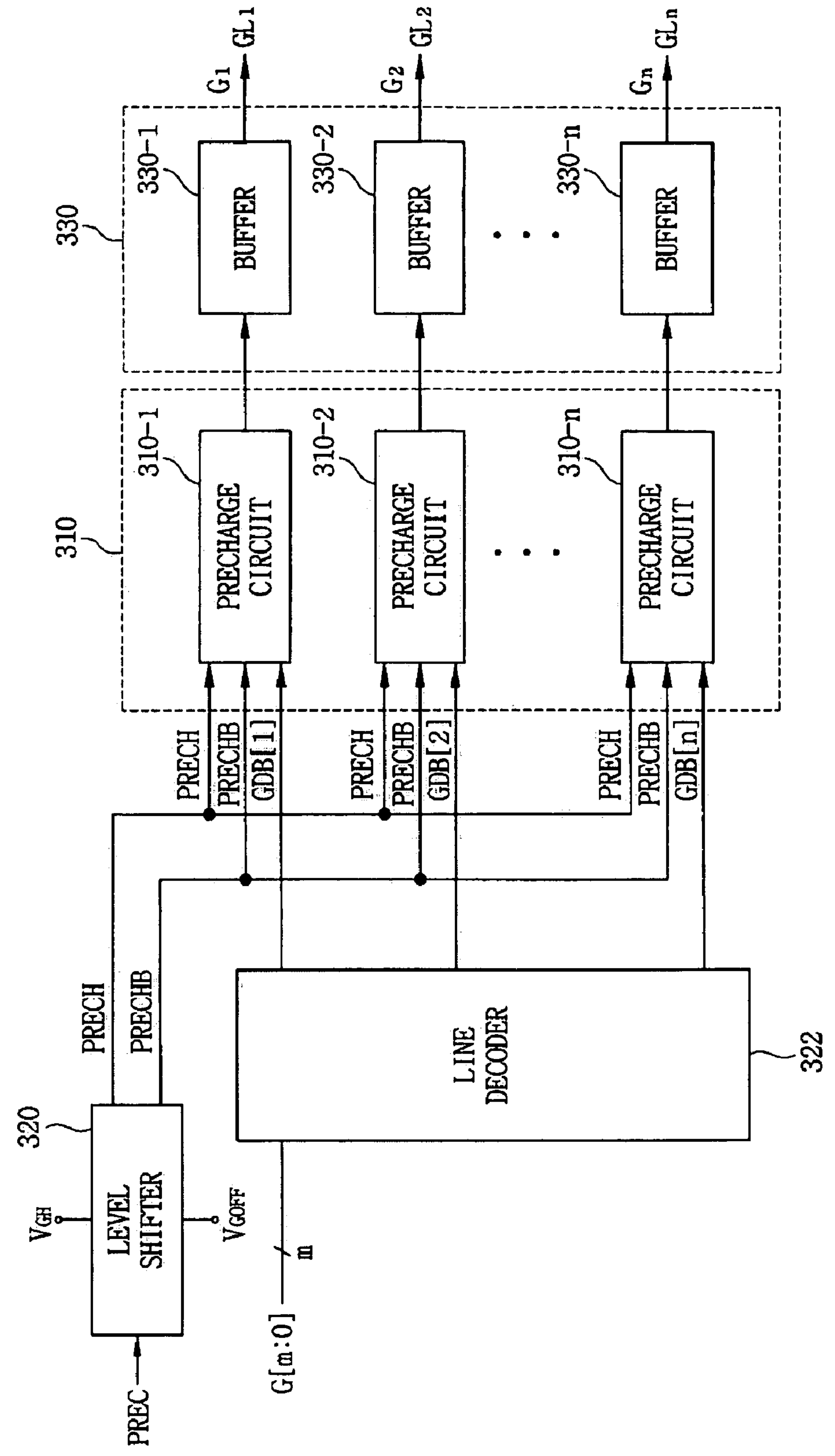
FIG. 5 is a schematic diagram that illustrates a gate driver circuit according to an exemplary embodiment of the present invention.

FIG. 5 is a block diagram that schematically illustrates a gate driver circuit (300) according to an exemplary embodiment of the invention. In one exemplary embodiment, the gate driver circuit (300) can be implemented in the system (100) of FIG. 1 for driving a flat panel display such as an LCD. In general, as depicted in FIG. 5, the gate driver (300) comprises a level shifter (320), a line decoder (322), precharge circuits (310) and buffers (drivers) (330). As explained below, the architecture of the gate driver circuit (300) provides a compact design (as compared to the conventional gate driver of FIG. 2, for example) such that the gate driver (300) can be implemented on a smaller gate driver IC chip.

The level shifter (320) receives as input DC voltages of $V_{GH}$ (a predetermined gate driver turn-on voltage of e.g., +15 v) and $V_{GOFF}$ (a predetermined gate driver turn-off voltage of e.g., −8 v), as well as a precharge control signal (PREC) of logic level $V_{DD}$ or $V_{SS}$. The level shifter (320) outputs a level-shifted precharge control signal (PRECH/PRECHB), where PRECH=$V_{GH}$ and PRECHB=$V_{GOFF}$, or where PRECH=$V_{GOFF}$ and PRECHB=$V_{GH}$, depending on the logic level of the input precharge control signal (PREC). The level-shifted precharge control signal (PRECH/PRECHB) is commonly input to each of a plurality of precharge circuits (310-1~310-n) (or generally, 310-i). An exemplary embodiment of the level shifter circuit (320) and method of operation thereof, will be explained below with reference to the exemplary embodiment depicted in FIG. 6.

Figure 2:
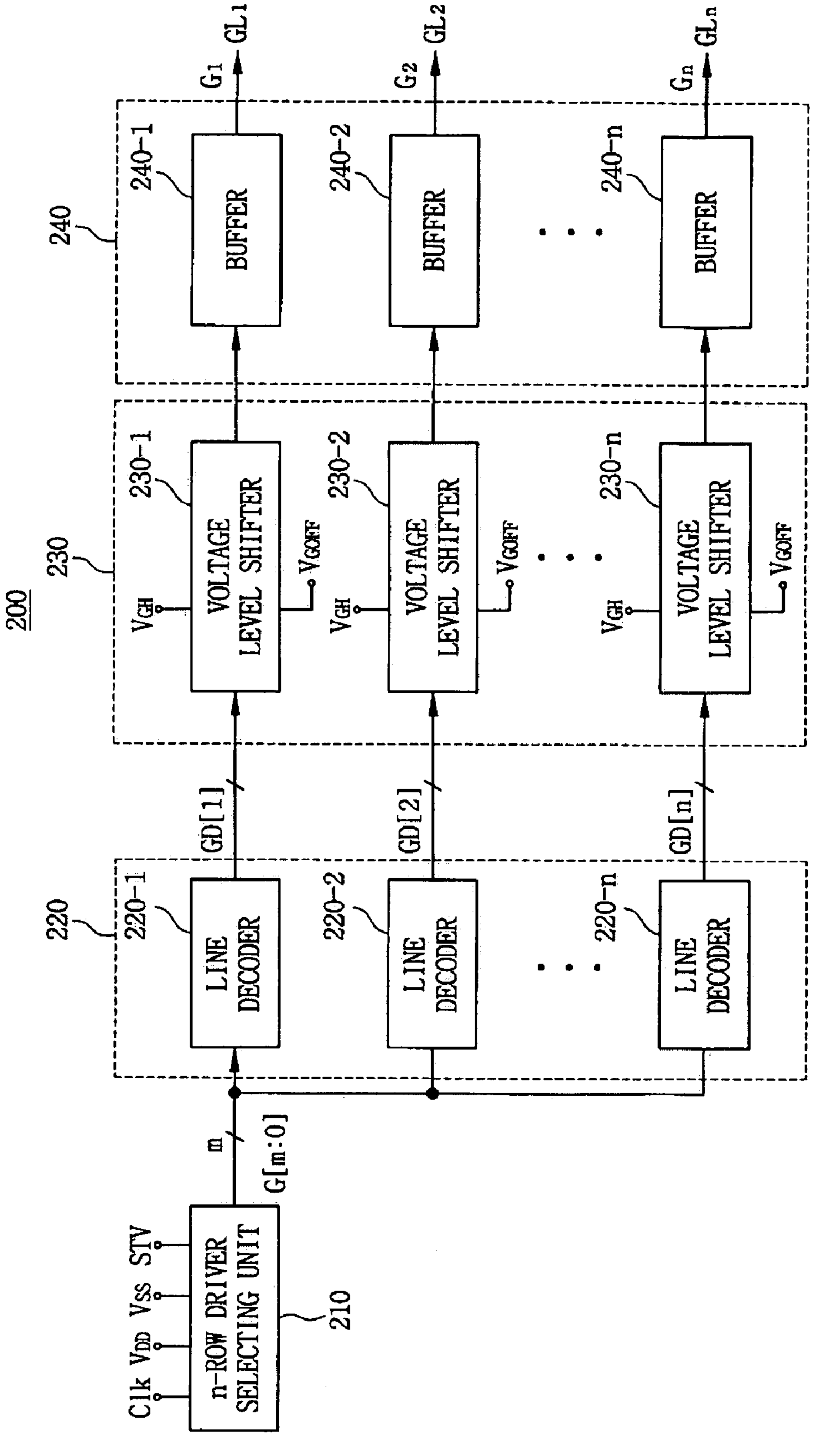
FIG. 2 (PRIOR ART)
FIG. 2 is a schematic diagram that illustrates a conventional gate driver circuit.

The line decoder (322) decodes a gate line control signal G[m:0] and generates a plurality of decoded gate line control signals (GDB[1]~GDB[n]) (or generally, GDB[i]), which are output to corresponding precharge circuits (310-1~310-n). In one exemplary embodiment, the line decoder (322) comprises a plurality of separate line decoders each associated with a corresponding one of the gate lines (GL1~GLn) (or generally, GLi), such as shown in FIG. 2. Each decoded gate line control signal (GDB[i]) will have a logic level of $V_{DD}$ (logic power supply voltage) or $V_{SS}$ (logic ground voltage), depending on which gate line (GL1~GLn) is to be selected as indicated by the gate line control signal G[m:0].

Each precharge circuit (310-1~310-n) receives as input the level-shifted precharge control signal (PRECH/PRECHB) and a corresponding decoded gate line control signal GDB[i] during precharging and driving phases of operation of the gate driver (300). The buffers (330) include a plurality of buffers (drivers) (330-1~330-n) (or generally, 330-i), each of which being connected to the output of a corresponding one of the precharge circuits (310-1~310-n), for driving corresponding gate lines (GL1~GLn) using a respective gate driver output signal (G1~Gn) (or generally, Gi), based on the output of the precharge circuits (310-1~310-n).

In general, during a precharging phase, each precharge circuit (310-1~310-n) operates by precharging a gate driver turn-on voltage ($V_{GH}$) in response to the precharge control signal (PRECH/PRECHB) before a corresponding gate line (GLi) is activated. The precharged turn-on voltage ($V_{GH}$) that is generated by each precharge circuit (310-1~310-n) during the precharge phase is output to corresponding buffers (320-1~320-n), which generate gate driver output signals (G1~Gn) having a voltage level of $V_{GOFF}$. Accordingly, a precharging phase results in all gate lines (GL1~GLn) being initialized to $V_{GOFF}$.

Subsequently, during a driving phase, if a gate line (GLi) is selected in response to a corresponding decoded gate line control signal (GDB[i]), the corresponding precharge circuit (310-i) operates to discharge the precharged gate driver turn-on voltage ($V_{GH}$), which results in the corresponding buffer (320-i) driving the gate line (GLi) with a gate driver output signal Gi=$V_{GH}$ On the other hand, if the gate line (GLi) is not selected in response to the corresponding decoded gate line control signal (GDB[i]), the corresponding precharge circuit (310-i) operates to maintain the precharged gate driver turn-on voltage ($V_{GH}$), which results in the corresponding buffer (320-i) driving the gate line (GLi) with a gate driver output signal Gi=$V_{GOFF}$ (i.e., the initialization voltage $V_{GOFF}$ is maintained on the gate line (GLi)). Details regarding operation of the precharge circuits (310) and buffers (330) will be explained below with reference to the exemplary embodiments 7, 8 and 9, for example.

Figure 6:
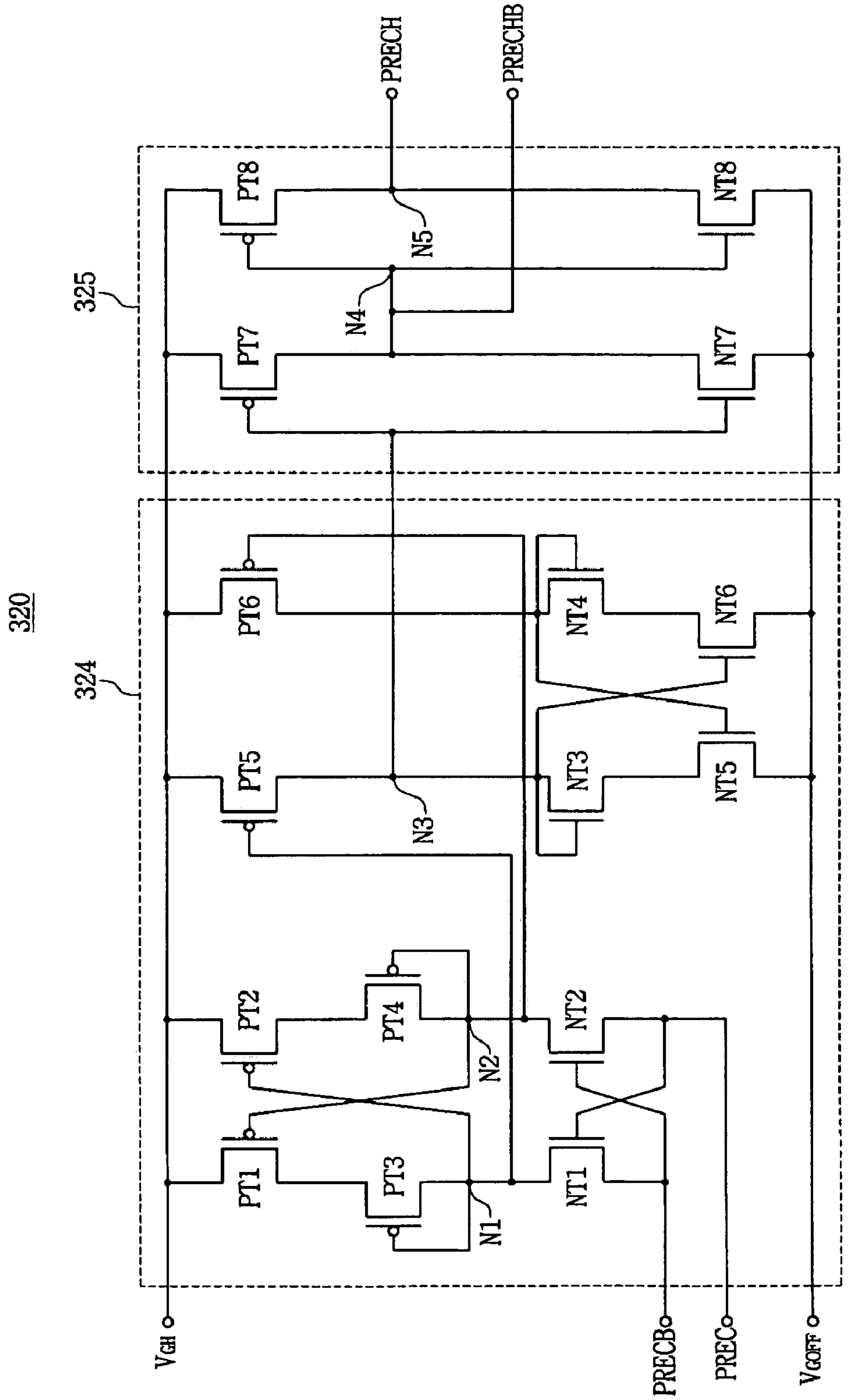
FIG. 6 is a circuit diagram that illustrates a voltage level shifter circuit for generating precharge control signals, according to an exemplary embodiment of the present invention.

FIG. 6 is a circuit diagram illustrating a level shifter circuit for generating a level-shifted precharge control signal (PRECH/PRECHB) according to an exemplary embodiment of the invention. In particular, FIG. 6 depicts one exemplary embodiment of the level shifter (320) shown in FIG. 5. The level shifter (320) comprises a level shifter (324) and a buffer (driver) (325). The level shifter (324) is similar in circuit architecture and operation of the level shifter (230-i) depicted in FIG. 3. However, the level shifter (324) receives as input the precharge control signal (PREC/PRECB), where PREC and PRECB are at complementary logic levels ($V_{DD}$, $V_{SS}$), and then level-shifts the precharge control signal to generate either $V_{GH}$ or $V_{GOFF}$ at Node N3, depending on the logic levels of PREC and PRECB. The voltage of Node N3 is input to the buffer (325), which outputs a level-shifted precharge control signal (PRECH/PRECHB). The buffer (325) comprises two inverters and is similar in circuit architecture and function of the buffer (240-i) shown in FIG. 3. However, in the buffer (325) of FIG. 6, an output terminal is connected to node N4 (i.e., the output of the first inverter formed by transistors PT7 and NT7) for outputting the complementary precharge control signal (PRECHB).

In general, the level shifter (320) operates as follows. When the logic level of the precharge control signal (PREC) is $V_{DD}$ and the logic level of the complementary precharge control signal (PRECB) is $V_{SS}$, the level-shifted precharge control signal (PRECH) and complementary precharge control signal (PRECHB) are at logic levels $V_{GH}$ (e.g., +15 v) and $V_{GOFF}$ (e.g., −8 v), respectively. On the other hand, when the logic level of the precharge control signal (PREC) is $V_{SS}$ and the logic level of the complementary precharge control signal (PRECB) is $V_{DD}$, the level-shifted precharge control signal (PRECH) and complementary precharge control signal (PRECHB) are at logic levels $V_{GOFF}$ and $V_{GH}$, respectively. The operation of the level shifter (320) of FIG. 6 is similar to that of the circuit shown in FIG. 3 and a detailed discussion thereof will not be repeated.

Figure 7:
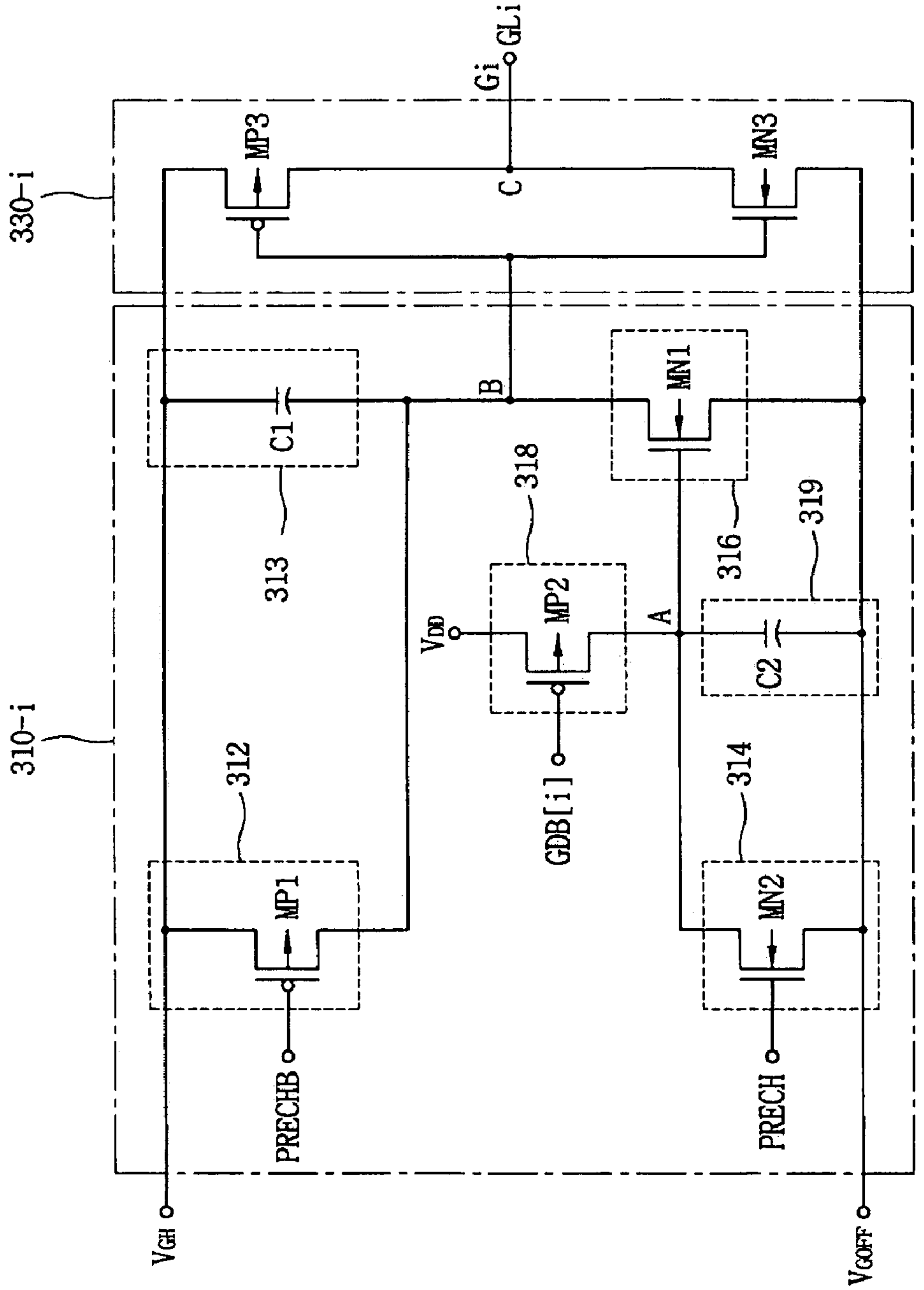
FIG. 7 is a circuit diagram that illustrates a precharge circuit and buffer circuit according to an exemplary embodiment of the present invention, which can be implemented in the gate driver circuit of FIG. 5.

FIG. 7 is a circuit diagram illustrating a precharge circuit (310-i) and output buffer (330-i) according to an exemplary embodiment of the invention. In particular, FIG. 7 illustrates one exemplary circuit architecture according to the invention, which can be implemented for each of the precharge circuits (310-1~310-n) and corresponding buffers (330-1~330-n) shown in FIG. 5. The precharge circuit (310-i) comprises four transistors (312, 314, 316, and 318), two storage devices (313 and 319) and an output Node B. In the exemplary embodiment, the storage devices (313 and 319) comprise capacitors (C1 and C2). The buffer (330-i) comprises an inverter comprised of PMOS transistor MP3 and NMOS transistor MN3. The output Node B of the precharge circuit (310-i) is connected to the input of the buffer (330-i) The precharge circuit (310-i) and buffer (330-i) generally operate as follows. The precharge circuit (310-i) receives as input the level-shifted precharge control signal (PRECH) and complementary precharge control signal (PRECHB) at the gate terminals of NMOS transistor (314) and PMOS transistor (312), respectively. As noted above, the level-shifted precharge control signal (PRECH/PRECHB) is commonly applied to all precharge circuits (310-1~310-n). The precharge circuit (310-i) also receives as input a corresponding decoded gate line control signal GDB[i] from the line decoder (322) (FIG. 5), which is input to the gate terminal of PMOS transistor (318).

During a precharging phase, the precharge circuit (310-i) charges Node B to $V_{GH}$ in response to the precharge control signal (PRECH/PRECHB), which results in the gate line (GLi) being initialized to $V_{GOFF}$. In particular, since the output Node B is precharged to logic level $V_{GH}$, the logic level at Node C is $V_{GOFF}$, and the gate driver output signal Gi=$V_{GOFF}$ to initialize the gate line (GLi) to $V_{GOFF}$. As noted above, the precharging phase results in all gate lines (GL1~GLn) being initialized to $V_{GOFF}$.

Subsequently, during a driving phase, if the gate line (GLi) is selected in response to the decoded gate line control signal (GDB[i]) input to the gate of transistor (318), the precharge circuit (310-i) operates to discharge the precharged gate driver turn-on voltage $V_{GH}$ at Node B to $V_{GOFF}$, which causes the voltage at Node C to become $V_{GH}$. As a result, the gate line (GLi) is driven with a gate driver output signal Gi=$V_{GH}$. On the other hand, if the gate line (GLi) is not selected in response to the decoded gate line control signal (GDB[i]), the precharge circuit (310-i) operates to maintain the precharged gate driver turn-on voltage $V_{GH}$ at Node B, which results in maintaining the voltage level $V_{GOFF}$ at Node C. As a result, the gate driver output signal Gi=$V_{GOFF}$ is applied to the gate line (GLi) (i.e., the initialization voltage $V_{GOFF}$ is maintained on the gate line (GLi)).

Figure 8:
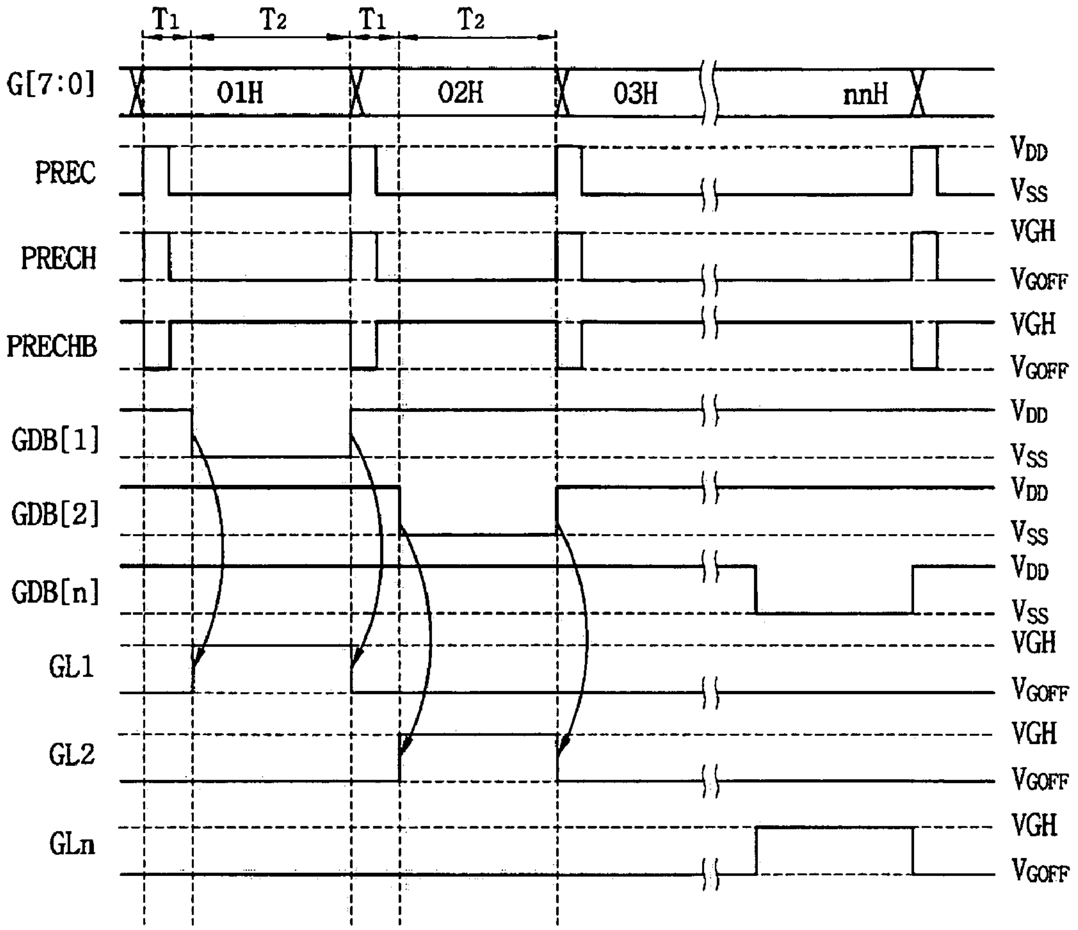
FIG. 8 is an exemplary timing diagram that illustrates a mode of operation of the circuit of FIG. 7.

A more detailed description of an exemplary method of operation of the precharge circuit (310-i) and buffer (330-i) will now be provided with reference to the circuit diagrams of FIGS. 5 and 7 and the timing diagram illustrated in FIG. 8. In the timing diagram of FIG. 8, it is assumed that the gate lines (GL1~GLn) are sequentially activated starting with gate line GL1. In FIG. 8, time periods T1 denote precharging phases and time periods T2 denote driving phases. A precharging phase is performed to initialize the gate lines (GL1~GLn) to $V_{GOFF}$, prior to a driving phase in which a selected gate line (GLi) is activated.

A precharging phase is commenced by inputting a precharge control signal of PREC=$V_{DD}$ and PRECB=$V_{SS}$ to the level shifter (320). In response, as described above, the level shifter (320) outputs a level-shifted precharge control signal of PRECH=$V_{GH}$ and PRECHB=$V_{GOFF}$, which is commonly input to each of the precharge circuits (310-1~310-n). Moreover, during precharge, all decoded gate line control signals (GDB[1]~GDB[n]) are set at logic level $V_{DD}$.

Referring to FIG. 7, during a precharge phase, the precharge control signal PRECHB=$V_{GOFF}$ is input to the gate of PMOS transistor (312), the precharge control signal PRECH=$V_{GH}$ is input to the gate of NMOS transistor (314) and the decoded gate line control signal GDB[i]=$V_{DD}$ is input to the gate terminal of PMOS transistor (318). As a result, PMOS transistor (312) and NMOS transistor (314) are both turned ON and the PMOS transistor (318) and NMOS transistor (316) are both turned OFF. Consequently, the voltage at Node B is precharged to $V_{GH}$ and the voltage at Node A is precharged to $V_{GOFF}$. Since Node B is precharged to $V_{GH}$, transistor MN3 is turned ON and transistor MP3 is turned OFF, which results in Node C being pulled-down to $V_{GOFF}$. Therefore, a gate driver signal Gi=$V_{GOFF}$ is applied to the gate line (GLi). As noted above, during precharge, all precharge circuits generate a precharge voltage of $V_{GH}$ at Node B so that all gate lines (GL1~GLn) are initialized to $V_{GOFF}$.

After a precharging phase, a driving phase (T2) is commenced in which a gate line (GLi) is activated. In the exemplary embodiment of FIG. 8, it is assumed that gate line GL1 is initially selected. As shown in FIG. 8, a driving phase is commenced by inputting a precharge control signal of PREC=$V_{SS}$ and PRECB=$V_{DD}$ to the level shifter (320). In response, as described above, the level shifter (320) outputs a level-shifted precharge control signal of PRECH=$V_{GOFF}$ and PRECHB=$V_{GH}$, which is commonly input to each of the precharge circuits (310-1~310-n). Moreover, during a driving phase for gate line GL1, the decoded gate line control signal (GDB[1]) is set to logic level $V_{SS}$, while the decoded gate line control signals (GDB[2]~GDB[n]) for the other gate lines are maintained at logic level $V_{DD}$. As a result, a gate driver output signal of G1=$V_{GH}$ is applied to gate line GL1.

More specifically, referring to FIG. 7, assume that the precharge circuit (310-i) and buffer (330-i) are the precharge circuit (310-1) and buffer (330-1) for gate line GL1. During a driving phase for gate line GL1, the precharge control signal PRECHB=$V_{GH}$ is input to the gate of PMOS transistor (312), the precharge control signal PRECH=$V_{GOFF}$ is input to the gate of NMOS transistor (314) and the decoded gate line control signal GDB[1]=$V_{SS}$ is input to the gate terminal of PMOS transistor (318). As a result, PMOS transistor (312) and NMOS transistor (314) are both turned OFF and the PMOS transistor (318) is turned ON, which causes Node A to be charged from $V_{GOFF}$ to $V_{DD}$. With Node A charged to $V_{DD}$, NMOS transistor (316) is turned ON, which causes Node B to be discharged (pulled-down) to $V_{GOFF}$. Further, since Node B is discharged to $V_{GOFF}$, transistor MN3 is turned OFF and transistor MP3 is turned ON, which results in Node C being pulled-up to $V_{GH}$. Therefore, a gate driver signal G1=$V_{GH}$ is applied on gate line GL1 to drive the gate line.

Furthermore, during the driving phase of gate line GL1, although the level-shifted precharge control signals PRECHB=$V_{GH}$ and PRECH=$V_{GOFF}$ are applied to the precharge circuits (310-2~310-n) of gate lines (GL2~GLn), the decoded gate line control signals (GDB[2]~GDB[n]) are maintained at logic level $V_{DD}$, which causes the gate driver output signals (G2~Gn) to remain at $V_{GOFF}$.

More specifically, referring to FIG. 7, assume by way of example that the precharge circuit (310-i) and buffer (330-i) are the precharge circuit (310-2) and buffer (330-2) for gate line GL2. During the driving phase for gate line GL1 (as described above), the precharge control signal PRECHB=$V_{GH}$ is input to the gate of PMOS transistor (312), the precharge control signal PRECH=$V_{GOFF}$ is input to the gate of NMOS transistor (314) and the decoded gate line control signal GDB[2]=$V_{DD}$ is input to the gate terminal of PMOS transistor (318). As a result, PMOS transistor (312) and NMOS transistor (314) are both turned OFF and the PMOS transistor (318) is turned OFF. Since PMOS transistor (318) is OFF, the voltage at Node A is maintained at the precharged voltage $V_{GOFF}$ by the storage device (319). Since Node A is at $V_{GOFF}$, the NMOS transistor (316) is turned OFF, which causes Node B to be maintained at the precharged voltage $V_{GH}$ by the storage device (313). Further, since Node B is at $V_{GH}$, the gate driver output signal G2 on gate line GL2 is maintained at $V_{GOFF}$.

After each driving phase (T2) for a given gate line (GLi), a precharge phase (T1) is performed to initialize all gate lines to $V_{GOFF}$. For example, referring to FIG. 8, after the driving phase for gate line GL1, another precharge phase is performed, wherein GDB[1] is transitioned to logic level $V_{DD}$. In addition, the precharge control signal PREC=$V_{DD}$ is input to the level shifter (320) to generate a level-shifted precharge control signal of PRECH=$V_{GH}$ and PRECHB=$V_{GOFF}$, which is commonly input to all precharge circuits (310-1~310-n) to generate the precharged voltage $V_{GH}$ at Node B, and initialize the gate lines (GL1~GLn) to $V_{GOFF}$, in the same manner as discussed above. As depicted in FIG. 8, a driving phase for gate line GL2 is commenced by transitioning GDB[2] to logic level $V_{SS}$ and generating a level-shifted precharge control signal of PRECH=$V_{GOFF}$ and PRECHB=$V_{GH}$. The precharging and driving phase are sequentially repeated as discussed above to sequentially activate the gate lines (GL1~GLn).

Figure 3:
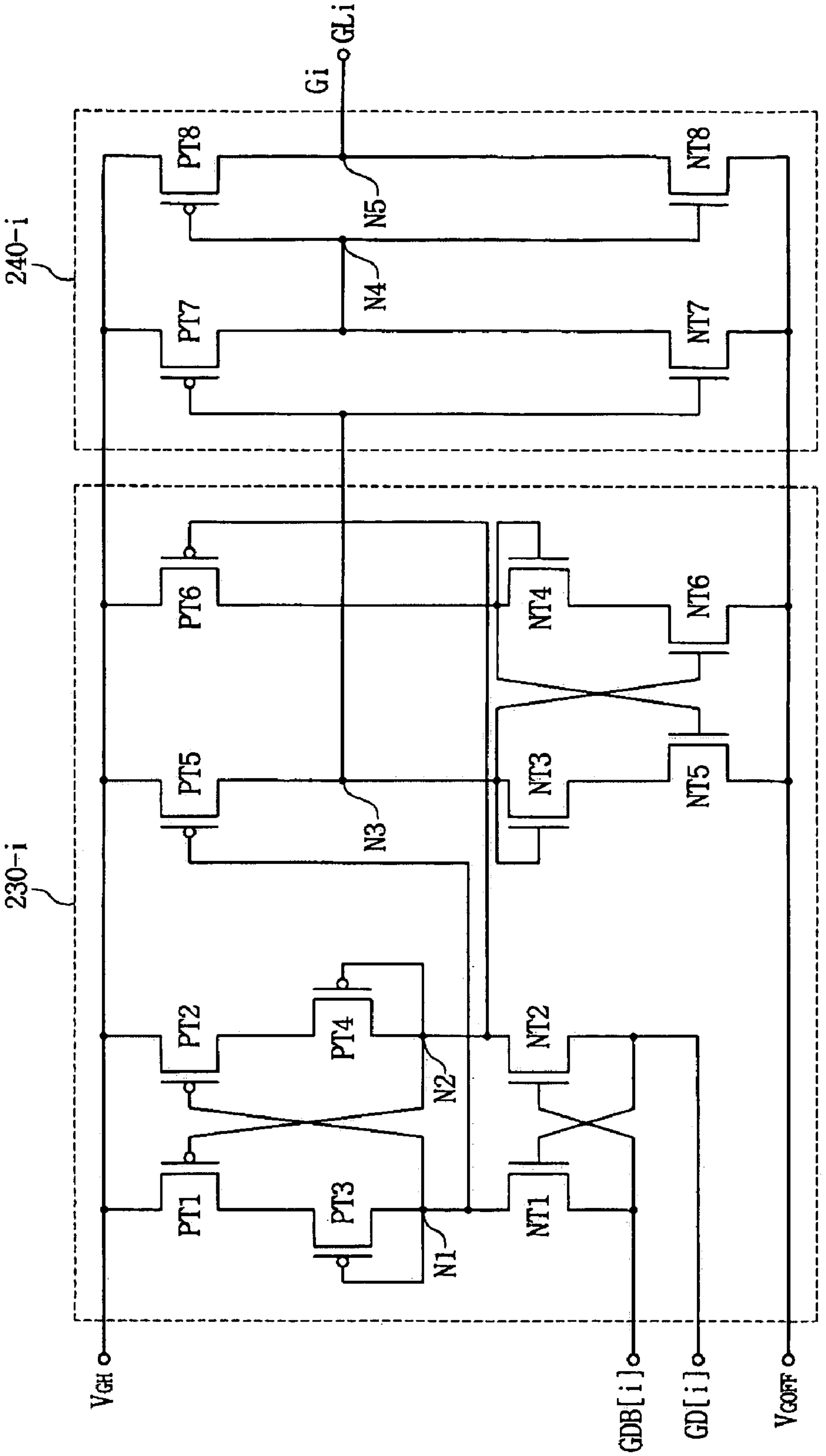
FIG.3 (PRIOR ART)
FIG. 3 is a circuit diagram that illustrates a conventional voltage level shifting and buffer circuit, which is implemented in the conventional gate driver circuit of FIG. 2.
Figure 4:
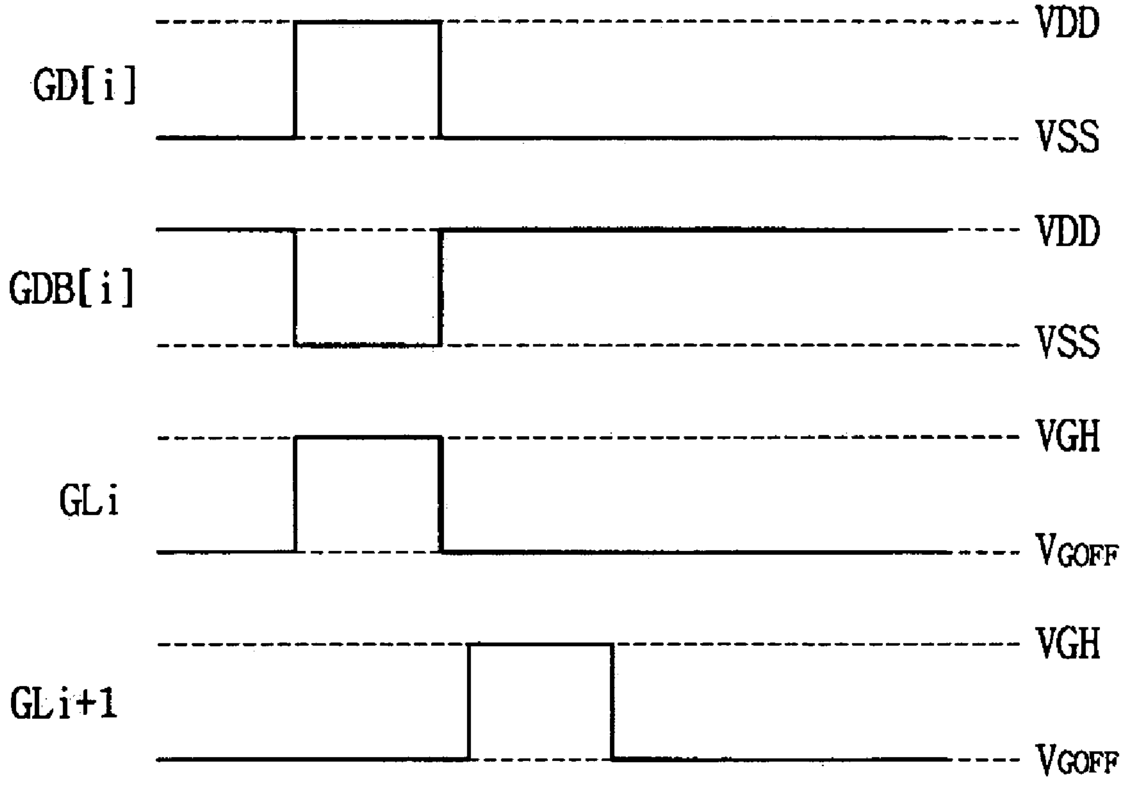
FIG.4 (PRIOR ART)
FIG. 4 is a waveform diagram illustrating the operation of the circuit of FIG. 3.

It is to be appreciated that the architecture of the gate driver circuit of FIG. 5 provides various advantages over the architecture of the conventional gate driver circuit of FIG. 2. For instance, the implementation of a single level shifter circuit (320) and the precharge circuits (310-1~310-n) in the exemplary gate driver architecture of FIG. 5 provides about a 50% reduction in the size of the gate driver IC chip as compared to the conventional gate driver circuit of FIG. 2. Indeed, the conventional gate driver circuit of FIG. 2 comprises a plurality of level shifters (230-1~230-n), each of which consisting of 12 transistors (as shown in FIG. 3). In contrast, in the exemplary embodiment of FIG. 7, each precharge circuit (310-1~310-n) includes only 4 transistors and two capacitors. Accordingly, the precharge circuits (310) in FIG. 5 occupy a significantly less amount of silicon area as compared to the level shifter circuits (230) in FIG. 2, thereby resulting in a smaller IC gate driver chip.

Figure 9:
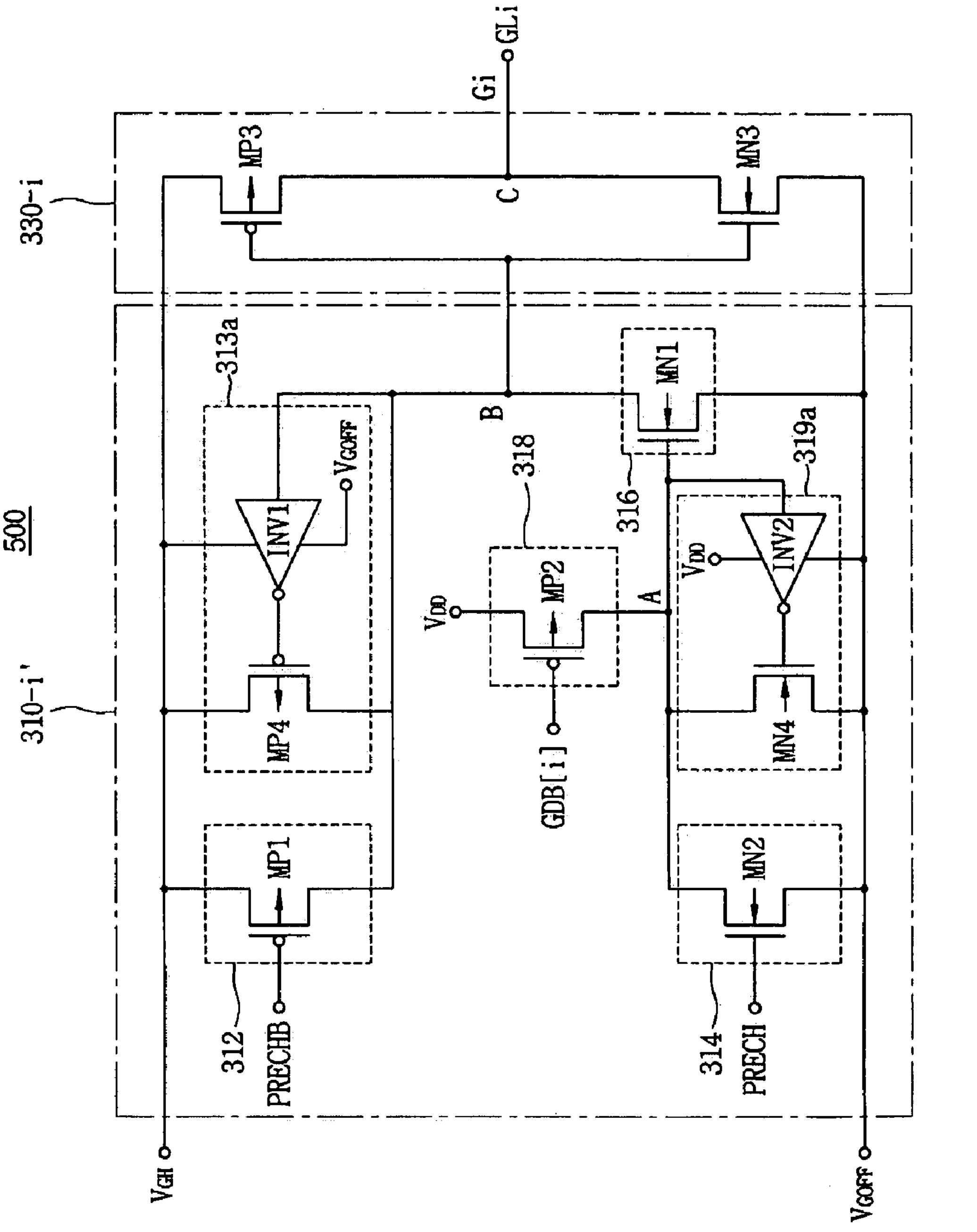
FIG. 9 is a circuit diagram that illustrates a precharge circuit and buffer circuit according to another exemplary embodiment of the present invention, which can be implemented in the gate driver circuit of FIG. 5.

FIG. 9 is a circuit diagram illustrating a precharge circuit and output buffer according to another exemplary embodiment of the invention. The circuit (500) comprises a precharge circuit (310-i') and buffer (330-i). The circuit (500) is similar in function and architecture as that of the circuit (400) of FIG. 7. However, the precharge circuit (310-i') in FIG. 9 comprises latch circuits (313*a* and 319*a*) as storage devices, as compared to the precharge circuit (310-i) of FIG. 7 in which the storage devices (313 and 319) are capacitors (C1 and C2).

The circuit (500) of FIG. 9 operates in a similar manner as the circuit (400) of FIG. 7. In particular, during a precharging phase, the precharge control signal PRECHB=$V_{GOFF}$ is input to the gate of PMOS transistor (312), the precharge control signal PRECH=$V_{GH}$ is input to the gate of NMOS transistor (314) and the decoded gate line control signal GDB[i]=$V_{DD}$ is input to the gate terminal of PMOS transistor (318). As a result, PMOS transistor (312) and NMOS transistor (314) are both turned ON and the PMOS transistor (318) and NMOS transistor (316) are both turned OFF. Consequently, since PMOS transistor (312) is ON, the voltage at Node B is brought to $V_{GH}$, and the output of the inverter (INV1) of the latch circuit (313*a*) is $V_{GOFF}$, which causes PMOS transistor MP4 to turn ON and maintain the voltage of $V_{GH}$ at Node B. Further, since NMOS transistor (314) is ON, the voltage at Node A is brought to $V_{GOFF}$, and the output of the inverter (INV2) of the latch circuit (319*a*) is $V_{DD}$, which causes NMOS transistor MN4 to turn ON and maintain the voltage of $V_{GOFF}$ at Node A. Further, since Node B is precharged to $V_{GH}$, the transistor MN3 is turned ON and MP3 is turned OFF, which results in a gate driver signal Gi=$V_{GOFF}$ being output to gate line GLi.

During a driving phase, assume GDB[i] is set to $V_{SS}$ for selecting the gate line GLi. The precharge control signal PRECHB=$V_{GH}$ is input to the gate of PMOS transistor (312), the precharge control signal PRECH=$V_{GOFF}$ is input to the gate of NMOS transistor (314) and the decoded gate line control signal GDB[i]=$V_{SS}$ is input to the gate terminal of PMOS transistor (318). As a result, PMOS transistor (312) and NMOS transistor (314) are both turned OFF and the PMOS transistor (318) is turned ON, which causes Node A to be charged from $V_{GOFF}$ to $V_{DD}$. With Node A charged to $V_{DD}$, the output of the inverter (INV2) of the latch (319*a*) is $V_{GOFF}$, which causes MN4 to turn OFF and, therefore, Node A is maintained at $V_{DD}$. With Node A maintained at $V_{DD}$, the NMOS transistor (316) is turned ON, which causes Node B to be discharged (pulled-down) to $V_{GOFF}$. Further, since Node B is discharged to $V_{GOFF}$, the transistor MN3 is turned OFF and MP3 is turned ON, which results in a gate driver signal Gi=$V_{GH}$ being output on gate line GLi.

Furthermore, during a driving phase, assume that GDB[i] is maintained at logic level $V_{DD}$ (another gate line is being driven). The precharge control signal PRECHB=$V_{GH}$ is input to the gate of PMOS transistor (312), the precharge control signal PRECH=$V_{GOFF}$ is input to the gate of NMOS transistor (314) and the decoded gate line control signal GDB[i] =$V_{DD}$ is input to the gate terminal of PMOS transistor (318). As a result, PMOS transistor (312) and NMOS transistor (314) are both turned OFF and the PMOS transistor (318) is turned OFF. Since Node A is precharged to $V_{DD}$, the transistor MN4 of the latch circuit (319*a*) is ON, which causes Node A to be maintained at the precharged voltage $V_{GOFF}$. Since Node A is at $V_{GOFF}$, the NMOS transistor (316) is turned OFF, which causes Node B to be maintained at the precharged voltage $V_{GH}$ by the storage device (313*a*). Indeed, the transistor MP4 of the latch circuit (313*a*) stays ON, which causes Node B to be maintained at $V_{GH}$. Since Node B is at $V_{GH}$, the gate driver output signal (Gi) on gate line GLi is maintained at $V_{GOFF}$.

It is to be appreciated that the exemplary circuit architecture of the precharge circuit (310-i') in FIG. 9 occupies less silicon area as compared to the level shifter circuit (230-i) of FIG. 3. Accordingly, the use of the precharge circuit architecture in FIG. 9 for the precharge circuits (310) in FIG. 5, as compared to the use of the level shifter circuit (230-i) in FIG. 3, would result in a smaller IC gate driver chip.

Although illustrative embodiments have been described herein with reference to the accompanying drawings, it is to be understood that the invention is not limited to the precise system and method embodiments described herein, and that various other changes and modifications may be affected therein by one skilled in the art without departing form the scope or spirit of the invention. All such changes and modifications are intended to be included within the scope of the invention as defined by the appended claims.

What is claimed is:

1. A gate driver circuit for driving a gate line of a display, comprising:

a line decoder for decoding a gate line control signal and generating a decoded gate line control signal for selectively activating a gate line coupled to an output of the gate driver circuit; and a precharge circuit comprising a first input node for receiving a first precharge control signal and a second input node for receiving a second precharge control signal during a precharge phase, the first precharge control signal being complimentary to the second precharge control signal, and a third input node for receiving the decoded gate line control signal output from the line decoder during a driving phase following the precharge phase, wherein during the precharge phase, the precharge circuit precharges a gate driver turn-on voltage in response to the first precharge control signal and the second precharge control signal, and wherein during the driving phase after the precharge phase, the precharge circuit (i) discharges the precharged gate driver turn-on voltage in response to the decoded gate line control signal to activate the gate line coupled to the output of the gate driver circuit and (ii) maintains the precharged gate driver turn-on voltage when the gate line is not selected for activation in response to the decoded gate line control signal.

2. The gate driver circuit of claim 1, further comprising an inverting buffer connected to an output node of the precharge circuit for buffering an output of the precharge circuit and driving the gate line coupled to the output of the gate driver circuit, wherein during the precharge phase, the output node of the precharge circuit is precharged to the gate driver turn-on voltage causing the inverting buffer to drive the gate line with a gate line initialization voltage.

3. The gate driver circuit of claim 1, further comprising a level shifter circuit for generating the first precharge control signal and the second precharge control signal.

4. The gate driver circuit of claim 1, wherein the precharge circuit comprises four transistors and two capacitors.

5. The gate driver circuit of claim 4, wherein a first capacitor stores the precharged gate driver turn-on voltage.

6. The gate driver circuit of claim 5, wherein a second capacitor stores a precharged gate driver turn-off voltage.

7. The gate driver circuit of claim 1, wherein the precharge circuit comprises four transistors and two latch circuits.

8. The gate driver circuit of claim 7, wherein a first latch circuit stores the precharged gate driver turn-on voltage.

9. The gate driver circuit of claim 8, wherein a second latch circuit stores a precharged gate driver turn-off voltage.

10. A semiconductor integrated gate driver circuit for driving gate lines of a display, comprising:

a plurality of gate driver circuits, wherein each gate driver circuit drives a corresponding one of a plurality of gate lines of the display;

a line decoder that decodes a gate line control signal and generates a decoded gate line control signal to selectively activate one of the plurality of gate lines of the display; and a level shifter circuit-configured to output a first precharge control signal and a second precharge control signal that are both commonly input to each of the gate driver circuits, the first precharge control signal being complimentary to the second precharge control signal, wherein each gate driver circuit comprises:

a precharge circuit comprising a first input node for receiving the first precharge control signal and a second input node for receiving the second precharge control signal during a precharge phase, and a third input node for receiving the decoded gate line control signal output from the line decoder during a driving phase following the precharge phase, wherein during the precharge phase, the precharge circuit precharges a gate driver turn-on voltage in response to the first precharge control signal and the second precharge control signal, and wherein during the driving phase after the precharge phase, the precharge circuit (i) discharges the precharged gate driver turn-on voltage in response to the decoded gate line control signal to activate the corresponding gate line coupled to an output of the gate driver circuit and (ii) maintains the precharged gate driver turn-on voltage when the gate line is not selected for activation in response to the decoded gate line control signal.

11. A liquid crystal display apparatus, comprising:

a liquid crystal display panel having a plurality of thin film transistors, a plurality of gate lines connected to gate electrodes of the thin film transistors, a plurality of data lines connected to source electrodes of the thin film transistors;

a source driver for driving the data lines to display an image on the liquid crystal display;

a gate driver comprising a plurality of gate driver circuits, wherein each gate driver circuit drives a corresponding gate line of the liquid crystal display panel; and a level shifter circuit configured to output a first precharge control signal and a second precharge control signal that are both commonly input to each of the gate driver circuits, the first precharge control signal being complimentary to the second precharge control signal, wherein each gate driver circuit comprises:

a line decoder for decoding a gate line control signal and generating a decoded gate line control signal for selectively activating a corresponding one of the gate lines driven by the gate driver circuit; and a precharge circuit comprising a first input node for receiving the first precharge control signal and a second input node for receiving the second precharge control signal during a precharge phase, and a third input node for receiving the decoded gate line control signal output from the line decoder during a driving phase following the precharge phase, wherein during the precharge phase, the precharge the circuit precharges a gate driver turn-on voltage in response to the first precharge control signal and the second precharge control signal, and wherein during the driving phase after the precharge phase, the precharge circuit (i) discharges the precharged gate driver turn-on voltage in response to the decoded gate line control signal to activate the corresponding gate line coupled to an output of the gate driver circuit and (ii) maintains the precharged gate driver turn-on voltage when the gate line is not selected for activation in response to the decoded gate line control signal.

12. The apparatus of claim 11, wherein each gate driver circuit further comprises an inverting buffer connected to an output node of the precharge circuit for buffering an output of the precharge circuit and driving the gate line coupled to the output of the gate driver circuit, wherein during the precharge phase, the output node of the precharge circuit is precharged to the gate driver turn-on voltage causing the inverting buffer to drive the gate line with a gate line initialization voltage.

13. The apparatus of claim 11, wherein each of the precharge circuits comprises four transistors and two capacitors.

14. The apparatus of claim 13, wherein a first capacitor stores the precharged gate driver turn-on voltage.

15. The apparatus of claim 14, wherein a second capacitor stores a precharged gate driver turn-off voltage.

16. The apparatus of claim 11, wherein each precharge circuit comprises four transistors and two latch circuits.

17. The apparatus of claim 16, wherein a first latch circuit stores the precharged gate driver turn-on voltage.

18. The apparatus of claim 17, wherein a second latch circuit stores a precharged gate driver turn-off voltage.

19. A system for driving a liquid crystal display apparatus, comprising:

a controller for generating source control signals and gate control signals;

a source driver for driving data lines of a liquid crystal display panel in response to the source control signals, and a gate driver for driving gate lines of the liquid crystal display panel in response to the gate control signals, to display an image on the liquid crystal display panel, the gate driver comprising a plurality of gate driver circuits, wherein each gate driver circuit drives a corresponding gate line; and a level shifter circuit configured to output a first precharge control signal and a second precharge control signal for the gate driver circuits, the first precharge control signal being complimentary to the second precharge control signal, wherein each gate driver circuit comprises:

a line decoder for decoding a gate line control signal and generating a decoded gate line control signal; and a precharge circuit comprising a first input node for receiving the first precharge control signal and a second input node for receiving the second precharge control signal during a precharge phase, and a third input node for receiving the decoded gate line control signal output from the line decoder during a driving phase following the precharge phase, wherein during the precharge phase, the precharge circuit precharges a gate driver turn-on voltage in response to the first precharge control signal and the second precharge control signal, and wherein during the driving phase after the precharge phase, the precharge circuit (i) discharges the precharged gate driver turn-on voltage in response to the decoded gate line control signal to activate the corresponding gate line coupled to an output of the gate driver circuit and (ii) maintains the precharged gate driver turn-on voltage when the gate line is not selected for activation in response to the decoded gate line control signal.

20. A gate driver circuit for driving a gate line of a display, comprising:

a line decoder for decoding a gate line control signal and generating a decoded gate line control signal;

a level shifter configured to output a first precharge control signal and a second precharge control signal, the first precharge control signal being complimentary to the second precharge control signal; and a precharge circuit responsive to the decoded gate line control signal, the first precharge control signal and the second precharge control signal to generate and store a gate driver voltage signal during a precharge phase to cause initialization of a gate line coupled to the output of the precharge circuit, wherein during a driving phase after the precharge phase, the precharge circuit (i) discharges the stored precharged gate driver voltage signal in response to the decoded gate line control signal to activate the gate line coupled to the output of the precharge circuit and (ii) maintains the precharged gate driver voltage signal when the gate line is not selected for activation in response to the decoded gate line control signal.

21. The gate driver circuit of claim 20, further comprising an inverting buffer for buffering an output of the precharge circuit.

22. The gate driver circuit of claim 20, wherein the precharge circuit comprises four transistors and two capacitors.

23. The gate driver circuit of claim 22, wherein a first capacitor stores a precharged gate driver turn-on voltage.

24. The gate driver circuit of claim 23, wherein a second capacitor stores a precharged gate driver turn-off voltage.

25. The gate driver circuit of claim 20, wherein the precharge circuit comprises four transistors and two latch circuits.

26. The gate driver circuit of claim 25, wherein a first latch circuit stores a precharged gate driver turn-on voltage.

27. The gate driver circuit of claim 26, wherein a second latch circuit stores a precharged gate driver turn-off voltage.

28. A method for driving a gate line of a display, comprising the steps of:

decoding a gate line control signal to generate a decoded gate line control signal;

precharging a gate driver turn-on voltage in response to a first precharge control signal and a second precharge control signal during a precharge phase before activating the gate line, wherein precharging the gate driver turn-on voltage causes initialization of the gate line and the first precharge control signal is complimentary to the second precharge control signal;

discharging the precharged gate driver turn-on voltage during a driving phase when the gate line is activated in response to the decoded gate line control signal; and maintaining the precharged gate driver turn-on voltage during the driving phase when the gate line is not activated in response to the decoded gate line control signal.

29. The method of claim 28, further comprising initializing the gate line with a gate driver turn-off voltage in response to the precharging step.

30. The method of claim 29, further comprising outputting a gate driver signal having a gate driver turn-on voltage level to drive the gate line, when the precharged gate driver turn-on voltage is discharged.

31. The method of claim 29, further comprising outputting a gate driver signal having a gate driver turn-off voltage level to maintain the gate line initialized, when the precharged gate driver turn-on voltage is not discharged.

32. The method of claim 28, wherein the precharging is performed in response the decoded gate line control signal.

33. The method of claim 28, further comprising level-shifting the first precharge control signal and the second precharge control signal to one of a predetermined gate driver turn-on voltage or a predetermined gate driver turn-off voltage so that each of the signals are complimentary to one another.

34. The method of claim 33, wherein the precharging is performed in response to the precharge control signals having a first state, and wherein the discharging and maintaining are performed in response to the precharge control signals having a second state, depending on a state of the decoded gate line control signal.

35. A gate driver circuit for driving a gate line of a display, comprising:

a line decoder configured to decode a gate line control signal to generate a decoded gate line control signal for selectively activating the gate line; and a precharge circuit configured to precharge an output node of the precharge circuit to a gate driver turn-on voltage during a precharge phase in response to first and second precharge control signals that are complimentary to each other, the precharge circuit being configured to discharge the output node to a gate driver turn-off voltage during a driving phase following the precharge phase when the gate line is selected in response to the decoded gate line control signal, and configured to maintain the output node at the precharged gate driver turn-on voltage during the driving phase when the gate line is not selected in response to the decoded gate line control signal, the precharge phase and the driving phase being periodically repeated.

36. The gate driver circuit of claim 35, further comprising an inverting buffer connected to the output node of the precharge circuit for buffering an output of the precharge circuit to drive the gate line.

37. The gate driver circuit of claim 35, further comprising a level shifter circuit for generating the precharge control signal that is periodically activated during the precharge phase.

38. The gate driver circuit of 35, wherein the precharge circuit comprises:

a first PMOS transistor coupled to the output node of the precharge circuit, and configured to precharge the output node to the gate driver turn-on voltage during the precharge phase in response to an inversion signal of the precharge control signal; and a first NMOS transistor coupled to the output node of the precharge circuit, and configured to discharge the output node to the gate driver turn-off voltage or maintain the output node at the precharged gate driver turn-on voltage during the driving phase in response to the decoded gate line control signal.

39. The gate driver circuit of claim 38, wherein the precharge circuit further comprises:

a second NMOS transistor coupled to a first node that is coupled to a gate of the first NMOS transistor, and configured to turn off the first NMOS transistor during the precharge phase in response to the precharge control signal; and a second PMOS transistor coupled to the first node, and configured to turn on the first NMOS transistor to discharge the output node to the gate driver turn-off voltage during the driving phase when the gate line is selected in response to the decoded gate line control signal.

40. The gate driver circuit of claim 39, wherein the precharge circuit further comprises:

a first storage device coupled between the output node and a terminal for providing the gate driver turn-on voltage; and a second storage device coupled between the first node and a terminal for providing the gate driver turn-off voltage.

41. The gate driver circuit of claim 40, wherein the first and second storage device comprise capacitors.

42. The gate driver circuit of claim 40, wherein the first and second storage device comprise latch circuits.

* * * * *